(12) United States Patent
Zhang

(10) Patent No.: US 11,157,378 B2
(45) Date of Patent: Oct. 26, 2021

(54) METHOD, DEVICE, DATA STORAGE SYSTEM, AND COMPUTER PRODUCT FOR ERROR INJECTION

(71) Applicant: EMC IP Holding Company LLC, Hopkinton, MA (US)

(72) Inventor: Min Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/831,334

(22) Filed: Mar. 26, 2020

(65) Prior Publication Data
US 2020/0349040 A1 Nov. 5, 2020

(30) Foreign Application Priority Data
Apr. 30, 2019 (CN) .......................... 201910363907.7

(51) Int. Cl.
*G06F 11/00* (2006.01)
*G06F 11/22* (2006.01)
*G06F 11/10* (2006.01)
*G06F 11/07* (2006.01)

(52) U.S. Cl.
CPC ...... *G06F 11/2215* (2013.01); *G06F 11/0772* (2013.01); *G06F 11/0775* (2013.01); *G06F 11/1076* (2013.01); *G06F 11/221* (2013.01)

(58) Field of Classification Search
CPC ............. G06F 11/2215; G06F 11/0772; G06F 11/0775; G06F 11/1076; G06F 11/221

USPC ......................................... 714/703, 733, 734
See application file for complete search history.

(56) References Cited

U.S. PATENT DOCUMENTS

| | | | |
|---|---|---|---|
| 6,182,248 B1* | 1/2001 | Armstrong | G06F 11/221 714/43 |
| 10,289,510 B1 | 5/2019 | Craig | |
| 10,324,508 B2 | 6/2019 | Guowu et al. | |
| 10,796,035 B1 | 10/2020 | Guowu et al. | |
| 10,969,844 B2 | 4/2021 | Guowu et al. | |
| 2012/0266033 A1* | 10/2012 | Gold | G06F 11/2215 714/718 |
| 2019/0130991 A1* | 5/2019 | Son | G06F 11/1064 |

\* cited by examiner

*Primary Examiner* — Christine T. Tu
(74) *Attorney, Agent, or Firm* — BainwoodHuang

(57) ABSTRACT

Error injection techniques involve, while a data storage system is in an error injection mode, injecting information representing an error of a storage device array into a first switch, such that the information representing the error is passed from a first downstream port of the first switch to a computing device through a second switch, the first and second switches being connected to the storage device array via downstream ports, and the first downstream port being connected to a second downstream port of the second switch; and determining error handling capability of the data storage system by obtaining a handling result of the information representing the error from the computing device. Accordingly, errors from storage devices can be simulated to facilitate detecting error handling in the entire I/O path comprehensively.

21 Claims, 4 Drawing Sheets

METHOD, DEVICE, DATA STORAGE SYSTEM, AND COMPUTER PRODUCT FOR ERROR INJECTION

CROSS REFERENCE TO RELATED APPLICATION

This application claims priority to Chinese Patent Application No. CN201910363907.7, on file at the China National Intellectual Property Administration (CNIPA), having a filing date of Apr. 30, 2019, and having "METHOD, DEVICE, DATA STORAGE SYSTEM, AND COMPUTER PRODUCT FOR ERROR INJECTION" as a title, the contents and teachings of which are herein incorporated by reference in their entirety.

FIELD

Embodiments of the present disclosure relate to the field of data storage and more particularly, to a method, device, data storage system, and computer product for error injection.

BACKGROUND

With development of data storage technologies, storage servers are generally required to manage storage systems containing a large number of disks, where the servers usually communicate information with multiple disks through connections therebetween. It is usually required that a data storage systems need to satisfy requirements in terms of data reliability and stability. In order to satisfy these requirements, the data storage systems are often provided with error handing capability to detect or correct errors occurred in the systems. To achieve more robust systems, it is expected to test the error handing capability of the data storage systems. Such test can be implemented by actively injecting errors into a data storage system and monitoring error handling capability of that data storage system. The error injection-based mechanism can detect whether the data storage system can accurately handle an error (for example, issuing a reminder or performing corrections) when the error occurs, so as to take corresponding measures to timely restore or improve the system.

SUMMARY

Embodiments of the present disclosure provide an improved solution of error injection in a data storage system.

In a first aspect of the present disclosure, there is provided a method for error injection. The method includes, while a data storage system is in an error injection mode, injecting information representing an error of a storage device array of the data storage system into a first switch of the data storage system, such that the information representing the error is passed from a first downstream port of the first switch, through a second switch of the data storage system, to a computing device connected with the second switch, the first switch and the second switch being connected to the storage device array via respective downstream ports, and the first downstream port being connected to a second downstream port of the second switch in the error injection mode; and determining error handling capability of the data storage system by obtaining a handling result of the information representing the error from the computing device.

In a second aspect of the present disclosure, there is provided an electronic device. The electronic device includes a processor and a memory coupled to the processor and storing instructions for execution, the instructions, when executed by the processor, causing the electronic device to perform acts including: while a data storage system is in an error injection mode, injecting information representing an error of a storage device array of the data storage system into a first switch of the data storage system, such that the information representing the error is passed from a first downstream port of the first switch, through a second switch of the data storage system, to a computing device connected with the second switch, the first switch and the second switch being connected to the storage device array via respective downstream ports, and the first downstream port being connected to a second downstream port of the second switch in the error injection mode; and determining error handling capability of the data storage system by obtaining a handling result of the information representing the error from the computing device.

In a third aspect, there is provided a data storage system, including: a storage device array; a computing device; and a first switch and a second switch being connected to the storage device array via respective downstream ports, the second switch being connected to the computing device via upstream ports, where in an error injection mode of the data storage system, the first switch is injected with information representing an error of the storage device array of the data storage system, a first downstream port of the first switch and a second downstream port of the second switch being connected such that the information representing the error is passed from the first switch to the second switch, which in turn passes the information representing the error to the computing device.

In a fourth aspect of the present disclosure, there is provided a computer program product. The computer program product is tangibly stored on a computer-readable medium and includes computer-executable instructions, the computer-executable instructions, when executed, causing a device to perform the method in the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The objectives, advantages and other features of the present disclosure will become more apparent through the detailed description of example embodiments of the present disclosure with reference to the accompanying drawings, where the same reference symbols generally refer to the like elements in the example embodiments of the present disclosure.

DETAILED DESCRIPTION

Figure 1:
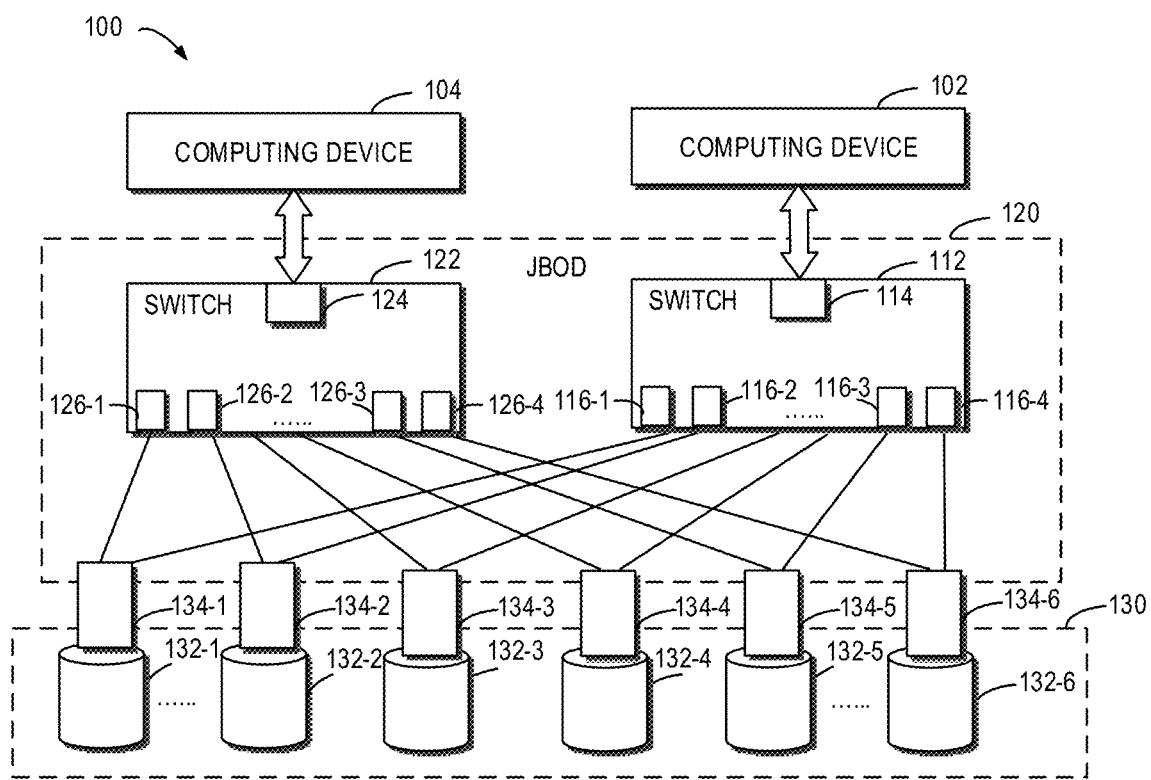
FIG. 1 illustrates a block diagram of a data storage system in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will now be described with reference to several example embodiments illustrated in the drawings. Although some preferred embodiments of the present disclosure are shown in the drawings, it would be appreciated that description of those embodiments is merely for purpose of enabling those skilled in the art to better understand and further implement the present disclosure without suggesting any limitation to the scope disclosed herein in any manner.

As used herein, the term "include" and its variants are to be read as open-ended terms that mean "include, but is not limited to." The term "or" is to be read as "and/or" unless explicitly being defined otherwise. The term "based on" is to be read as "based at least in part on." The terms "one example embodiment" and "an embodiment" are to be read as "at least one example embodiment." The term "another embodiment" is to be read as "at least one further embodiment." The terms "first" and "second" can represent different or the same objects. Other definitions, either explicit or implicit, may be included below.

FIG. 1 illustrates a schematic diagram of architecture of a data storage system 100 in which embodiments of the present disclosure can be implemented. It would be appreciated that structure and function of the data storage system 100 are described for purpose of examples only without suggesting any restrictions over the scope of the present disclosure. Embodiments of the present disclosure can also be applied into the data storage system 100 having different structures and/or functions.

As shown in FIG. 1, a storage device array 130 for storing data is deployed in the data storage system 100. The storage device array 130 can include a plurality of storage devices 132-1 to 132-6 and so on. For convenience of description, the storage devices 132-1 to 132-6 are sometimes collectively or individually referred to as storage device 132. It would be appreciated that the number of storage devices shown in FIG. 1 is only by way of example without suggesting any limitation to the scope of the present disclosure.

The storage devices 132 can be non-volatile storage devices or storage units, such as Solid State Disks (SSDs), magnetic disks, and the like. The storage devices 132 can conform to an appropriate interface specification, for example, the NVMe Interface Specification. The storage devices 132 conforming to the NVMe Interface Specification sometimes may be referred to as NVMe devices or NVMe disks. The storage capacity of each storage device 132 can be of any size.

In the data storage system 100, at least one computing device, such as computing devices 102, 104, is configured to control Input/Output (I/O) operations for the storage devices 132. The computing devices 102, 104 may sometimes be referred to as storage servers or host devices. Each of the computing devices 102, 104 can execute data read/write operations for the storage devices 132 responsive to requests from users or other devices and can manage data access and storage of the storage devices 132.

The respective storage devices 132 can be connected to the computing devices 102, 104 via a Just a Bunch of Disks (JBOD) Array Enclosure 120. JBOD is sometimes referred to as a Disk Array Enclosure (DAE). JBOD 120 is an independent array enclosure external to the computing devices to support interactions between the connected storage devices and the computing devices. In some embodiments, JBOD 120 is an external device independent from the computing devices 102, 104 and may lack of storage management or processing functions.

JBOD 120 includes a plurality of switches, such as a switch 112 and a switch 122. The switch 112 and the switch 122 are both connected to the storage devices 132 and are respectively connected with the computing devices 102, 104. Accordingly, the computing devices 102, 104 can perform I/O operation controls on these storage devices 132. In the example of FIG. 1, the respective storage devices 132-1 to 132-6 are inserted into corresponding slots (e.g., U.2 slot interfaces) of each of the switches 112, 122 via paddle cards 134-1 to 134-6, so as to connect to downstream ports of the switches 112, 122. For purpose of illustration, only example downstream ports 116-1 to 116-4 of the switch 112 and example downstream ports 126-1 to 126-4 of the switch 122 are depicted in FIG. 1. However, it would be appreciated that there may be more downstream ports.

The switches 112, 122 each include upstream ports 114 and 124 for connecting with the corresponding computing devices 102, 104. For convenience of description, the paddle cards 134-1 to 134-6 are sometimes collectively or individually referred to as paddle card 134; downstream ports 116-1 and 116-2 of the switch 112 are sometimes collectively or individually referred to as downstream ports 116, and downstream ports 126-1 and 126-2 of the switch 122 are sometimes collectively or individually referred to as downstream ports 126.

Throughout the present disclosure, a port connecting a switch to a computing device is referred to as an upstream port while a port connecting the switch to a storage device is referred to as a downstream port. The terms "upstream port" and "downstream port" here are not intended for limiting transmission directions of data. In other words, a storage device can send data to a switch via a downstream port, and the switch can also send data to the storage device via the downstream port. Similarly, a computing device can send data to the switch via an upstream port, and the switch can also send data to the computing device via the upstream port. As a switch, its upstream port and downstream ports perform data communications therebetween according to an internal exchange layout to forward the data to corresponding destinations.

The redundant design based on multiple switches can ensure access to the storage devices 132 via a further switch when a given switch in the JBOD 120 fails. Although FIG. 1 illustrates two switches 112, 122, more switches can also be included to further increase redundancy level. Further, although FIG. 1 illustrates a dual switch-dual computing device structure, a single storage device can be connected to two or more switches to perform I/O access to the storage devices 132 via different switches respectively.

In some embodiments, interconnections between the storage devices 132 and the switches 112, 122 and interconnections between the switches 112, 122 and the computing devices 102, 104 can be based on a bus. When the bus is a Peripheral Component Interface Express (PCIe) link or PCIe bus, the switches 112, 122 can be PCIe switches. The PCIe switches 112, 122 can communicate with the storage devices 132 and the computing devices 102, 104 based on the PCIe protocol.

In a normal operation mode of the data storage system 100, if the computing device 102 or 104 requires an I/O operation for a certain storage device 132, information from the computing device 102 or 104 is provided to upstream ports of the switches 112, 122 and then forwarded to the downstream port 116 or 126 of the storage devices 132 via the internal exchange layouts of the switches 112, 122, and further passed to the storage device 132 after arriving at the downstream port 116 or 126. In a reverse path, information from a storage device 132 (such as read data, a response to a write request, or the like) is provided to downstream ports 116, 126 of the switches 112, 122 and forwarded to the upstream ports 114 and 124 via the internal exchange layouts and then arrives at the corresponding computing devices 102, 104. In the normal operation mode, although downstream ports of different switches are connected to a same storage device 132, the different switches perform the I/O access to the storage device 132 independently.

Software and/or hardware-level errors may occur during operation of the data storage system 100. The occurrence of the errors may result in erroneous information transmission in the I/O path of the data storage system 100, such as generation of erroneous information or failure of passing information to its destination. The computing device 102 or 104 usually is configured with corresponding error handling capability to detect or correct errors in the system. For example, when an error is detected, corresponding acts can be performed to correct the error or a warning can be issued if the error cannot be corrected. Since it cannot predict errors that occur accidentally during the system's operation, in order to test the error handling capability of the system, specific information indicating errors can be actively injected into the data storage system to observe handling results of the error information.

As mentioned above, it is expected to test or detect the error handling capability of the data storage system. An error handling detection mechanism can be implemented based on error injection. Errors may occur in the storage devices or the links between the storage devices which are the hardware infrastructure of the data storage system. Accordingly, it is important and meaningful to test how the data storage system handles errors related to storage devices. Usually, manufacturers of storage devices do not provide any methods for directly injecting errors at the storage devices. Therefore, it cannot be detected whether the computing devices are able to take the right measures when information representing an error is transmitted through the entire I/O path from the storage devices up to the computing devices, which leads to difficulties in detecting the error handling capability of the data storage system.

In accordance with embodiments of the present disclosure, there is proposed an improved error injection scheme to simulate errors from storage devices. In this scheme, a plurality of switches of a data storage system connects with a storage device array via their respective downstream ports. While the data storage system is in an error injection mode, the downstream ports of the two switches are connected. Information representing an error of the storage device array is injected into one of the switches and passed from the switch to the other switch and further to a computing device connected with the other switch. Error handling capability of the data storage system is determined by obtaining a handling result of the information representing the error from the computing devices.

Through such error injection method, errors from the underlying storage devices can be simulated in the scenario where a computing device is connected to the storage devices through the switches, which facilitates detection of error handling of the data storage system in the entire I/O path comprehensively. In addition, without requiring any dedicated error injection tools, the error injection method can be easily applied into any suitable storage device arrays, especially to NVMe storage device arrays included in the JBOD.

Example embodiments of the present disclosure will be described in detail below with reference to the drawings.

Figure 2:
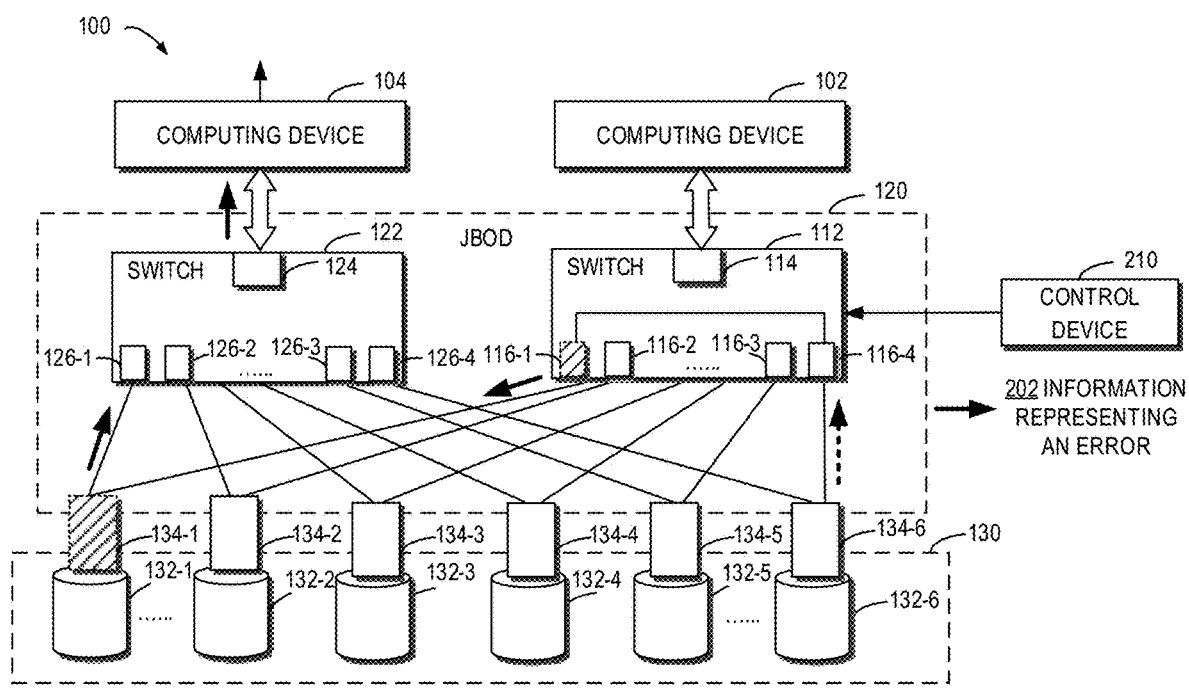
FIG. 2 schematically illustrates a block diagram of an example of the data storage system in an error injection mode in accordance with an embodiment of the present disclosure.

FIG. 2 illustrates a system block diagram of a data storage system in an error injection mode in accordance with some embodiments of the present disclosure. For convenience of discussion, the embodiments of error injection in the data storage system are discussed with reference to the data storage system 100 in FIG. 1. It would be appreciated that error injection of the embodiments of the present disclosure can be applied into other data storage systems having dual switches or multiple switches.

In FIG. 2, the data storage system 100 is set to the error injection mode in which a control device 210 is configured to inject information 202 representing the error of the storage device array 130 into the data storage system 100. As a control device of the error injection, the control device 202 may be independent from the data storage system 100. The control device 202 can be any computing device. The information 202 representing the error of the storage device array 130 can indicate a possible error occurred in the storage devices of the storage device array 130.

In some embodiments, the information 202 representing the error can be in form of a data packet that is transmitted within the data storage system 100 but contain an error. Such error may, for example, be resulted from internal failure of the storage device (such as an error of the stored data) or an error link of the storage device (for example, an erroneous Transaction Layer Packet (TLP)). It would be appreciated that the information 202 representing the error can represent any possible error generated at the storage device array when testing the error handling capability of the data storage system 100. The information 202 representing the error can be pre-designed. For example, the information can be generated by a tester based on testing requirements.

In accordance with embodiments of the present disclosure, the information 202 representing the error is injected to one switch in the JBOD 120. As an example in FIG. 2, the information 202 representing the error is injected into the switch 112. In order to pass the information 202 representing the error of the storage device array along a complete I/O path from the underlying storage devices, in the embodiments of the present disclosure, the switch 112 passes the information 202 representing the error to the peer switch 122 and such information is then passed, through the switch 122, to the computing device 104 connected thereto. In this example, the switch 112 sometimes is also referred to as a first switch 112 and the switch 122 sometimes is also referred to as a second switch 122 herein.

The control device 210 can be connected to the JBOD 120, specifically to the switch 112 when the error injection is required. The connection between the control device 210 and the switch 112 can be any connections supporting their communications. In some embodiments, the control device 210 can be connected, via a Universal Asynchronous Receiver/Transmitter (UART) interface (sometimes also referred to as a serial interface) or Ethernet cables, to the switch 112 to inject the information 202 representing the error to the switch 112.

In order to pass the information 202 representing the error to the computing device 104, in accordance with embodiments of the present disclosure, the downstream ports of the switches 112, 122 are connected. For purpose of illustration, in the example of FIG. 2, the downstream port 116-1 of the switch 112 is connected with the downstream port 126-1 of the switch 114. In this example, the downstream port 116-1 sometimes is also referred to as a first downstream port and the downstream port 126-1 sometimes is also referred to as a second downstream port herein. During the normal operation, the downstream ports 116-1 and 126-2 have no interconnection therebetween and are connected to the storage devices 132, respectively. However, in the error injection mode, the two downstream ports are connected with each other, for example, by short-circuiting the links which connect the paddle card 134-1 of the storage device unit 132-1 to the two downstream ports 116-1 and 126-1. In this way, the switch 122 can obtain the information 202 representing the error from the switch 112 through a direct connection between the downstream ports 116-1 and 126-1. Here the paddle card 134-1 is short-circuited and accordingly the storage device 132-1 is in an offline state.

In some embodiments, upon injection of the information 202 representing the error, the downstream port 116-1 is configured to operate as an upstream port of the switch 112. That is, the downstream port 116-1 is considered as an upstream port in the error injection mode to transmit information to devices other than the storage devices 132. Besides, the port 116-1 can also be connected to a further downstream port in the switch 112, for example, a downstream port 116-4. In this example, the downstream port 116-4 sometimes is also referred to as a third downstream port herein. As such, the control device 210 can inject the information 202 representing the error into the downstream port 116-1. Due to the configurations of the downstream port 116-1 and its connection with the downstream port 126-1, the information 202 representing the error can be transmitted to the downstream port 126-1 and accordingly can be passed to the upstream port 124 via the internal exchange layout 122 of the switch 122, and further received by the computing device 104. In FIG. 2, solid arrows represent a delivery path of the information 202 representing the error.

By means of the connections of the ports in the switches, from the perspective of the computing device 104, the information 204 of the error is considered to be received from the storage device array 130 via a complete I/O path of the computing device, the switch, and the storage device, which simulates a complete traveling path of an error generated at a storage device. In the data storage system, depending on its capability, the computing device 104 may take corresponding actions to process the information 202 representing the error. Through simulation of the errors from the storage devices, it is possible to more satisfactorily test a complete handling logic for errors in the data storage system 100 if the errors occur.

In some embodiments, for purpose of error injection and detection, the computing device 104 can also be configured to perform an I/O operation for the storage device 132-4 connected with the downstream port 116-4 in the storage device array 130, to pass the information 202 representing the error to the computing device 104. Therefore, it is beneficial to simulate the error handling capability of the data storage system 100 while the I/O operations are running. Such configuration can be achieved by a control instruction of the related configurations issued from the control device 210 to the computing device 104 or can be directly applied to the computing device 104 by the user.

In some embodiments, the user can specify the way for injecting the information 202 representing the error. For example, the user can specify the storage devices 132-1 and 132-N as to be tested through the control device 210 or other manner, so as to specify an I/O path from the storage device 132-N to the computing device 104. The user can manually connect the downstream ports 116-1 and 126-1 together and connect the downstream ports 116-4 and 116-1 together, so as to specify an I/O path to be tested. Therefore, as compared to the error injection using dedicated equipment, the present disclosure can realize a more flexible user-customized error injection.

As mentioned above, the computing device 104 in the data storage system 100 can be configured with error handling capability, so as to perform corresponding actions on the received information representing the error. In some embodiments, the computing device 104 can detect whether the received information representing the error is actively injected to the data storage system 100, which can prevent the computing device 104 from confusing the injected error with an error generated in the data storage system 100 during the error injection mode. The computing device 104 can obtain, from the control device 210, an identification of the currently injected error or a list of identifications of a plurality of errors which may possibly be injected into the control device 210. After receiving the information of the error from the switch 114, the computing device 104 may determine, by means of identification matching, that the received error matches with an error known from the control device 210, and thus determine that the received error is actively injected into the system 100 by the control device 210, instead of being generated within the system 100.

To monitor the result of the error injection, the control device 210 may obtain the handling result of the information representing the error from the computing device 104, so as to determine the error handling capability of the data storage system 100. The handling results can indicate whether the computing device 104 has the capability of accurately detecting errors and/or correcting the errors. In some embodiments, if it is determined that the information 202 representing the error is not detected or is not accurately corrected, an alert notification may also be provided to facilitate improvements to the error handling capability of the data storage system 100.

In the configuration of FIG. 2, as the storage device 132-1 is in an offline state and the downstream ports 116-4, 116-1, and 126-2 have specific connections therebetween, the storage device 132-6 can be normally accessed via the switch 122 from the perspective of the computing device 104, but the storage device 132-6 cannot be normally accessed via the switch 122 from the perspective of the computing device 102. As such, asymmetry presents in term of the respective numbers of storage devices accessible to the switches 112, 122. Such asymmetry may result in failure of normal operations of the computing devices 102, 104. In some embodiments, it is also required that the connections between the downstream ports 116, 126 of the switches 112, 122 and the storage device array 130 can be symmetrically arranged in order to ensure that the computing devices 102, 104 are still in normal operation state during the error injection mode.

Figure 3:
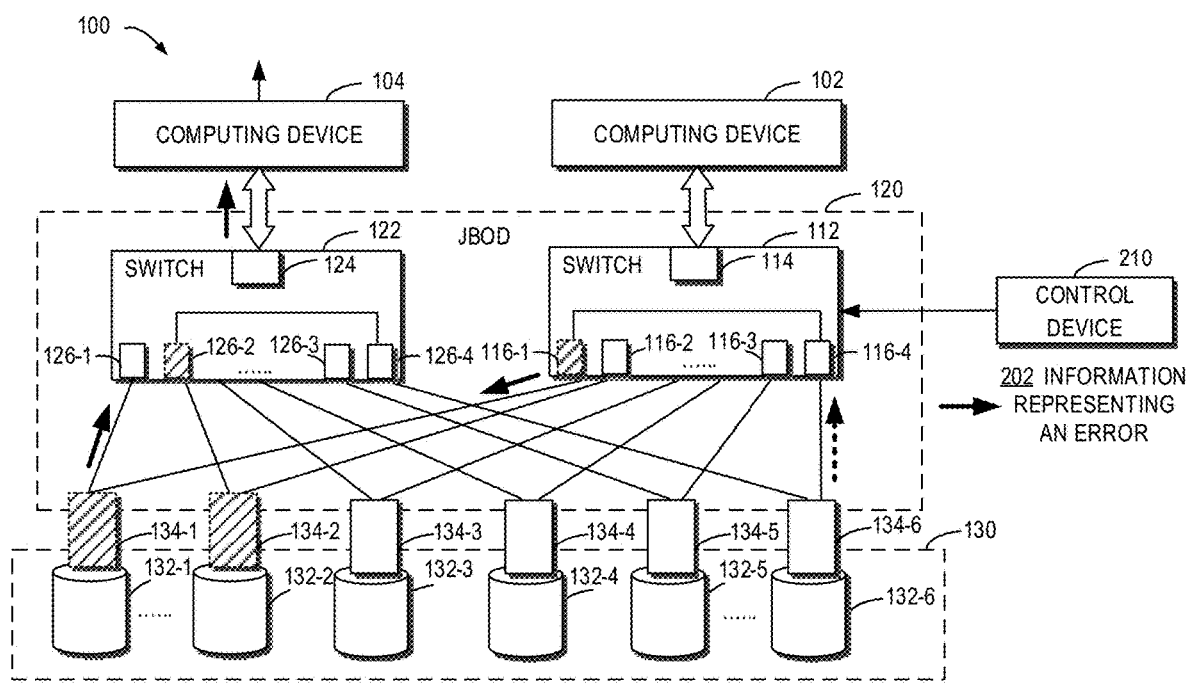
FIG. 3 schematically illustrates a block diagram of a further example of the data storage system in the error injection mode in accordance with an embodiment of the present disclosure.

FIG. 3 illustrates an example of the symmetrical configuration. It is assumed that the error injection is performed by taking the example of FIG. 2. In order to allow the computing device 104 and even the computing device 102 to stay in the normal operational state, the downstream port 126-2 of the switch 122 can also be symmetrically connected with the downstream port 116-2 of the switch 112 in the error injection mode as shown in FIG. 3. This can be implemented, for example, by short-circuiting the links which connect the paddle card 134-2 of the storage device 132-2 to the two downstream ports 116-2 and 126-2. In this example, the downstream port 126-2 sometimes is also referred to as a fourth downstream port and the downstream port 116-2 sometimes is also referred to as a fifth downstream port herein.

Furthermore, the downstream port 126-2 may be configured to operate as an upstream port of the switch 122 and to connect with the downstream port 126-4 of the switch 122. The downstream port 126-4 is connected to the same storage device 132-6 as the downstream port 116-4. In this example, the downstream port 126-4 sometimes is also referred to as a sixth downstream port herein. In a similar way, the paddle card 134-2 is short-circuited to turn the storage device 132-2 into the offline state. Through the above configuration, the computing device 102 can access to the storage device 132-6 via the downstream port 116-2 (which is further connected to the ports 126-2 and 126-4). Here the computing devices 102, 104 can be separately connected to the same number of storage devices 132 via their respective switches, thereby maintaining the normal operations in the error injection mode.

The above example embodiments describe injecting the information 202 representing the error into the switch 112 to test the error handling capability of the computing device 104 in the scenario where the information is passed from the underlying storage devices to the computing device 104. In other embodiments, the control device 210 can similarly inject information representing the error of the storage device array 130 from the switch 122, so as to detect the handling capability of the computing device 102 with respect to an error from the underlying storage devices.

Figure 4:
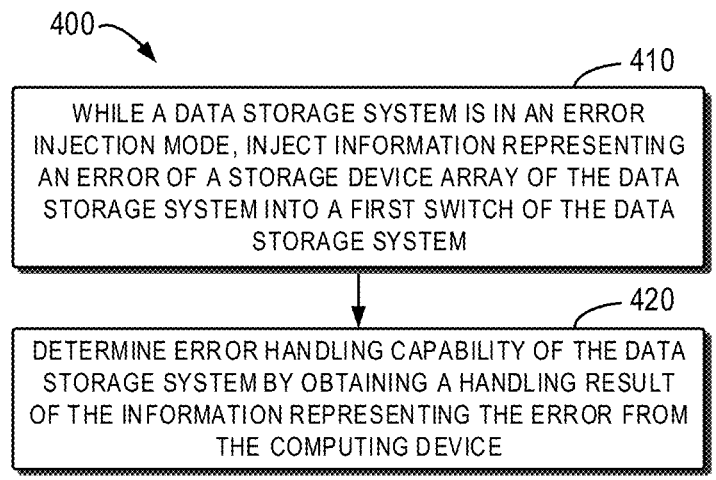
FIG. 4 illustrates a flowchart of a method for error injection in accordance with an embodiment of the present disclosure.

FIG. 4 illustrates a flowchart of a method 400 for error injection in accordance with some embodiments of the present disclosure. The method 400 can be implemented at the control device 210 of FIG. 2. For purpose of illustration, the method 400 is described with reference to FIG. 2.

At block 410, while a data storage system is in an error injection mode, the control device 210 injects information representing an error of a storage device array of the data storage system into a first switch of the data storage system, such that the information representing the error is passed from a first downstream port of the first switch, through a second switch of the data storage system, to a computing device connected with the second switch. The first switch and the second switch are connected to the storage device array via respective downstream ports, and the first downstream port is connected to a second downstream port of the second switch in the error injection mode. At block 420, the control device 210 determines error handling capability of the data storage system by obtaining a handling result of the information representing the error from the computing device.

In some embodiments, injecting the information representing the error includes: configuring the first downstream port to operate as an upstream port of the first switch; injecting the information representing the error at the first downstream port, the first downstream port being connected with a third downstream port of the first switch in the error injection mode; and causing the computing device to perform an I/O operation for a storage device in the storage device array that is connected with the third downstream port, to pass the information representing the error to the computing device.

In some embodiments, injecting the information representing the error at the first downstream port includes: in response to user specification in the error injection mode, injecting the information representing the error at the first downstream port.

In some embodiments, the first switch and the second switch are included in a just a Bunch of Disks (JBOD) Array Enclosure.

In some embodiments, the first switch and the second switch are Peripheral Component Interface Express (PCIe) switches.

Figure 5:
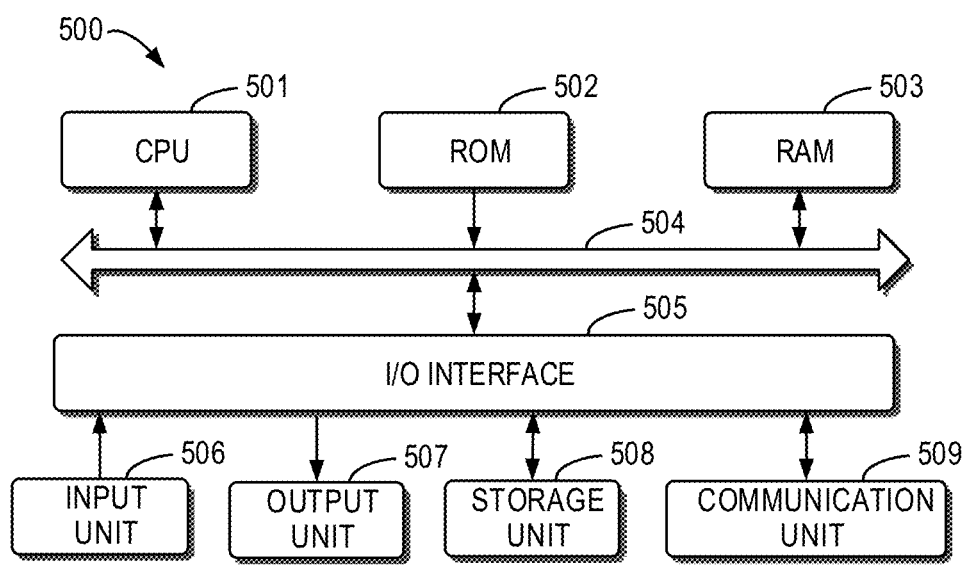
FIG. 5 illustrates a block diagram of an example device suitable for implementing embodiments of the present disclosure.

FIG. 5 illustrates a schematic block diagram of an example device 500 suitable for implementing the embodiments of the present disclosure. The device 500 can be implemented as or included in the computing device 102, the computing device 104, or the control device 210 of FIG. 2.

As shown, the device 500 includes a central process unit (CPU) 501, which can execute various suitable acts and processing according to computer program instructions that are stored in a read-only memory (ROM) 502 or loaded in a random-access memory (RAM) 503 from a storage unit 508. The RAM 503 can also store various programs and data required by the operations of the device 500. CPU 501, ROM 502 and RAM 503 are connected to each other via a bus 504. An input/output (I/O) interface 505 is also connected to the bus 504.

The components in the device 500 are connected to the I/O interface 505, which include the following: an input unit 506, such as a keyboard, mouse and the like; an output unit 507, e.g., various displays, loudspeakers, and the like; a storage unit 508, such as a magnetic disk, optical disk, and the like; and a communication unit 509, such as a network card, modem, wireless transceiver, and the like. The communication unit 509 allows the device 500 to exchange information/data with other devices via a computer network, such as Internet, and/or various telecommunication networks.

Each method and process described above, such as the method 400, can also be performed by the processing unit 501. In some embodiments, the method 400 can be implemented as a computer software program or a computer program product tangibly included in the machine-readable medium, e.g., storage unit 508. In some embodiments, the computer program can be partially or fully loaded and/or mounted to the device 500 via the ROM 502 and/or communication unit 509. When the computer program is loaded to the RAM 503 and executed by the CPU 501, one or more steps of the method 400 described above can be implemented. Alternatively, in other embodiments, the CPU 501 can be configured in any other suitable manners (e.g., by means of firmware) to perform the method 400.

Those skilled in the art would understand that various steps of the method of the disclosure above may be implemented via a general purpose computing device, which may be integrated on a single computing device or distributed over a network composed of a plurality of computing devices. Optionally, they may be implemented using program code executable from the computing device, such that they may be stored in a storage device and executed from the computing device; or they may be made into respective integrated circuit modules or a plurality of modules or steps therein may be made into a single integrated circuit module for implementation. In this way, the present disclosure is not limited to any specific combination of hardware and software.

It would be appreciated that although several means or sub-means (e.g., specialized circuitry) of the apparatus have been mentioned in detailed description above, such partition is only example but not limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not limiting the present disclosure. For those skilled in the art, the present disclosure may have various alternations and changes. Any modifications, equivalents and improvements made within the spirits and principles of the present disclosure should be included within the scope of the present disclosure.

I claim:

1. A method for error injection, comprising:
   while a data storage system is in an error injection mode, injecting information representing an error of a storage device array of the data storage system into a first switch of the data storage system, such that the information representing the error is passed from a first downstream port of the first switch, through a second switch of the data storage system, to a computing device connected with the second switch, the first switch and the second switch being connected to the storage device array via respective downstream ports, and the first downstream port being connected to a second downstream port of the second switch in the error injection mode; and
   determining error handling capability of the data storage system by obtaining a handling result of the information representing the error by the computing device.

2. The method of claim 1, wherein injecting the information representing the error comprises:
   configuring the first downstream port to operate as an upstream port of the first switch;
   injecting the information representing the error at the first downstream port, the first downstream port being connected with a third downstream port of the first switch in the error injection mode; and
   causing the computing device to perform an I/O operation for a storage device in the storage device array that is connected with the third downstream port, to pass the information representing the error to the computing device.

3. The method of claim 2, wherein injecting the information representing the error at the first downstream port comprises:
   in response to user specification in the error injection mode, injecting the information representing the error at the first downstream port.

4. The method of claim 1, wherein the first switch and the second switch are comprised in a Just a Bunch of Disks (JBOD) Array Enclosure.

5. The method of claim 1, wherein the first switch and the second switch are Peripheral Component Interface Express (PCIe) switches.

6. The method of claim 1, wherein injecting the information representing the error includes:
   providing the information representing the error into the first switch of the data storage system while a normal paddle card of the data storage system, which does not connect the first downstream port with the second downstream port, is replaced with a short-circuited paddle card that connects the first downstream port with the second downstream port.

7. An electronic device, comprising:
   a processor; and
   a memory coupled to the processor and storing instructions for execution, the instructions, when executed by the processor, causing the electronic device to perform acts comprising:
      while a data storage system is in an error injection mode, injecting information representing an error of a storage device array of the data storage system into a first switch of the data storage system, such that the information representing the error is passed from a first downstream port of the first switch, through a second switch of the data storage system, to a computing device connected with the second switch, the first switch and the second switch being connected to the storage device array via respective downstream ports, and the first downstream port being connected to a second downstream port of the second switch in the error injection mode; and
      determining error handling capability of the data storage system by obtaining a handling result of the information representing the error from the computing device.

8. The device of claim 7, wherein injecting the information representing the error comprises:
   configuring the first downstream port to operate as an upstream port of the first switch;
   injecting the information representing the error at the first downstream port, the first downstream port being connected with a third downstream port of the first switch in the error injection mode; and
   causing the computing device to perform an I/O operation for a storage device in the storage device array that is connected with the third downstream port, to pass the information representing the error to the computing device.

9. The device of claim 8, wherein injecting the information representing the error at the first downstream port comprises:
   in response to user specification in the error injection mode, injecting the information representing the error at the first downstream port.

10. The device of claim 7, wherein the first switch and the second switch are comprised in a Just a Bunch of Disks (JBOD) Array Enclosure.

11. The device of claim 7, wherein the first switch and the second switch are Peripheral Component Interface Express (PCIe) switches.

12. A data storage system, comprising:
a storage device array;
a computing device; and
a first switch and a second switch being connected to the storage device array via respective downstream ports, the second switch being connected to the computing device via upstream ports,
wherein, in an error injection mode of the data storage system, the first switch is injected with information representing an error of the storage device array of the data storage system, a first downstream port of the first switch and a second downstream port of the second switch being connected such that the information representing the error is passed from the first switch to the second switch, which in turn passes the information representing the error to the computing device.

13. The data storage system of claim 12, wherein the first downstream port is configured to operate as an upstream port of the first switch and to receive the information representing the error injected in the error injection mode; and
wherein the first downstream port is connected with a third downstream port of the first switch, and after the information representing the error are injected, the computing device performs an I/O operation for a storage device in the storage device array that is connected with the third downstream port.

14. The data storage system of claim 13, wherein in the error injection mode, a fourth downstream port of the second switch is connected with a fifth downstream port of the first switch, and the fourth downstream port is configured to operate as an upstream port of the second switch and is connected with a sixth downstream port of the second switch which is in turn connected to the storage device that is connected with the third downstream port.

15. The data storage system of claim 12, wherein the first switch and the second switch are comprised in a Just a Bunch of Disks (JBOD) Array Enclosure.

16. The data storage system of claim 12, wherein the first switch and the second switch are Peripheral Component Interface Express (PCIe) switches.

17. A computer program product having a non-transitory computer-readable medium which stores a set of instructions, the set of instructions, when executed, causing a device to perform a method of:
while a data storage system is in an error injection mode, injecting information representing an error of a storage device array of the data storage system into a first switch of the data storage system, such that the information representing the error is passed from a first downstream port of the first switch, through a second switch of the data storage system, to a computing device connected with the second switch, the first switch and the second switch being connected to the storage device array via respective downstream ports, and the first downstream port being connected to a second downstream port of the second switch in the error injection mode; and
determining error handling capability of the data storage system by obtaining a handling result of the information representing the error at the computing device.

18. The computer program product of claim 17, wherein the computer-executable instructions, when executed, causing the device to:
configure the first downstream port to operate as an upstream port of the first switch;
inject the information representing the error at the first downstream port, the first downstream port being connected with a third downstream port of the first switch in the error injection mode; and
cause the computing device to perform an I/O operation for a storage device in the storage device array that is connected with the third downstream port, to pass the information representing the error to the computing device.

19. The computer program product of claim 18, wherein the computer-executable instructions, when executed, causing the device to:
in response to user specification in the error injection mode, inject the information representing the error at the first downstream port.

20. The computer program product of claim 17, wherein the first switch and the second switch are comprised in a Just a Bunch of Disks (JBOD) Array Enclosure.

21. The computer program product of claim 17, wherein the first switch and the second switch are Peripheral Component Interface Express (PCIe) switches.

* * * * *